United States Patent
Ueda et al.

[11] Patent Number: 6,129,065
[45] Date of Patent: Oct. 10, 2000

[54] PISTON FOR A CYLINDER INJECTION ENGINE

[75] Inventors: Katsunori Ueda; Nobuaki Murakami, both of Kyoto; Takashi Kawabe, Funai-gun; Jun Takemura, Toyota; Tetsuo Kataoka, Okazaki, all of Japan

[73] Assignee: Mitsubishi Jidosha Kogyo Kabushiki Kaisha, Tokyo, Japan

[21] Appl. No.: 09/058,805

[22] Filed: Apr. 13, 1998

[30] Foreign Application Priority Data

Apr. 17, 1997 [JP] Japan ................................ 9-100080

[51] Int. Cl.[7] ................................................ H02B 23/00
[52] U.S. Cl. .......................................... 123/193.6; 123/302
[58] Field of Search ................................. 123/193.6, 294, 123/302, 667

[56] References Cited

U.S. PATENT DOCUMENTS

| | | | |
|---|---|---|---|
| 5,115,774 | 5/1992 | Nomura et al. | 123/302 |
| 5,115,776 | 5/1992 | Ohno et al. | 123/302 |
| 5,127,379 | 7/1992 | Kobayashi et al. | |
| 5,259,348 | 11/1993 | Kobayashi et al. | 123/302 |
| 5,305,720 | 4/1994 | Ando et al. | 123/302 |
| 5,816,215 | 10/1998 | Yoshidawa et al. | 123/302 |

FOREIGN PATENT DOCUMENTS

| | | |
|---|---|---|
| 3-52333 | 5/1991 | Japan. |
| 5-21132 | 3/1993 | Japan. |
| 9-79038 | 3/1997 | Japan. |

OTHER PUBLICATIONS

Patent Abstracts of Japan—Abstract for JP 06081651 A, published Mar. 22, 1994; Hiromitsu Ando et al.
Patent Abstracts of Japan—Abstract for JP 5–71350 A, published Mar. 23, 1983, Shizuo Sasaki.
Patent Abstracts of Japan—Abstract for JP 5–79337 A, published Mar. 30, 1993, Takanobu Ueda.
Patent Abstracts of Japan—Abstract for JP 5–240044 A, published Sep. 17, 1993, Hiromitsu Ando.
Patent Abstracts of Japan—Abstract for JP 240045 A, published Sep. 17, 1993, Hiromitsu Ando.
Patent Abstracts of Japan—Abstract for JP 5–240047 A, published Sep. 17, 1993, Hiromitsu Ando.
Patent Abstracts of Japan—Abstract for JP 5–240051 A, published Sep. 17, 1993, Shizuo Sasaki.

*Primary Examiner*—Marguerite McMahon
*Attorney, Agent, or Firm*—Birch, Stewart, Kolasch & Birch, LLP

[57] ABSTRACT

In a cylinder injection engine which includes an injection valve disposed in the vicinity of an intake port of the engine and adapted to inject fuel into the combustion chamber, a spark plug disposed closer to the center portion of the combustion chamber than the injection valve, and a piston having a cavity formed in the top face that substantially faces the injection valve and the spark plug, the cavity is formed by smoothly connecting a curved surface located below the spark plug and a curved surface located below the injection valve via a connection curved surface. The curvature $\kappa_1$ of the curved surface located under the injection valve and the curvature $\kappa_2$ of the curved surface located under the spark plug satisfy a relationship $\kappa_1 < \kappa_2$.

7 Claims, 7 Drawing Sheets

PISTON FOR A CYLINDER INJECTION ENGINE

BACKGROUND OF THE INVENTION

1. Field of the Invention

The present invention relates to a piston for a cylinder injection engine which is of a spark ignition type and in which fuel is injected directly into a combustion chamber.

2. Description of the Related Art

Internal combustion engines of a type in which fuel is injected within a cylinder are generally classified into a so-called cylinder-injection internal combustion engine and a so-called direct-injection internal combustion engine, and diesel engines have been widely known. However, in recent years, cylinder injection engines of the spark ignition type have been proposed as well (since spark ignition engines are generally gasoline engines, spark ignition engines will be referred to as "gasoline engines").

FIG. 6 shows a cross section of a combustion chamber and its vicinity within a typical cylinder injection engine.

In the cylinder injection engine shown in FIG. 6, a cylinder head 13 is securely fixed onto a cylinder block 11 via a cylinder head gasket 12 and through use of unillustrated bolts. A piston 15 is placed in a cylinder 14 within the cylinder block 11 such that the piston 15 is movable in the vertical direction. The cylinder block 11, the cylinder head 13, and the piston 15 define a combustion chamber 16, to which an intake port 17 and an exhaust port 18 are connected. The lower end portion of an intake valve 19 is situated in the intake port 17, while the lower end portion of an exhaust valve 20 is situated in the exhaust port 18. Unillustrated intake and exhaust cams are in engagement with the respective upper end portions of the intake valve 19 and the exhaust valve 20. When the intake and exhaust cams are driven, the intake valve 19 and the exhaust valve 20 are operated to establish and break fluid communication between the combustion chamber 16 and the ports 17 and 18.

Also, a fuel injection valve 21 for injecting fuel into the combustion chamber 16 is attached to the cylinder head 13 in a manner such that the lower tip of the fuel injection valve 21 faces the combustion chamber 16. The fuel injection valve 21 receives pressurized fuel from an unillustrated fuel pump and injects the pressurized fuel into the combustion chamber 16. Further, a spark plug 22 is attached to the cylinder head 13 such that the tip of the spark plug 22 faces the combustion chamber 16. The spark plug 22 ignites the fuel mist injected from the fuel injection valve 21 into the combustion chamber 16.

Accordingly, when an unillustrated crankshaft rotates, the piston 15 reciprocates within the cylinder 14 via a connecting rod. Meanwhile, the rotational drive force of the crankshaft is transmitted to the unillustrated camshaft so that the camshaft rotates synchronously with the rotation of the crankshaft. Thus, the intake valve 19 and the exhaust valve 20 are opened and closed by the intake cam and the exhaust cam. At this time, air is taken from the intake port 17 into the combustion chamber 16, and fuel is injected from the fuel injection valve 21 into the combustion chamber 16. Thus, a swirl flow of fuel mist is generated and ignited by the spark plug 22, so that a cycle comprising an intake stroke, a compression stroke, a power or expansion stroke, and an exhaust stroke is repeated.

In such a cylinder injection engine, a cavity (depression) is formed in the top face of the piston 15 in order to allow the fuel-air mixture to swirl within the combustion chamber 16 to burn efficiently when being ignited by the spark plug 22. A piston having a cavity in the top face is disclosed in, for example, Japanese Utility Model Application Laid-Open (kokai) No. 5-21132. However, in the piston disclosed in this publication, the depth of the cavity is increased on the exhaust valve side, and thus fuel mist is not caused to swirl, and therefore is not led to the spark plug. Therefore, the shape of the cavity is not suitable for a cylinder injection engine. In order to solve the above problem, the applicant of the present invention filed a patent application (Japanese Patent Application No. 7-233129) for an invention related to the shape of a piston having a cavity.

Each of FIGS. 7A, 7B, and 7C schematically shows a piston having a cavity for which the present applicant filed a patent application.

In the piston 101 shown in FIG. 7A, on the side where the intake valve is disposed, an intake-valve-side slant top face 102 is formed such that the top face 102 inclines upward toward the center portion of the piston, and on the side where the exhaust valve is disposed, an exhaust-valve-side slant top face 103 is formed such that the top face 103 inclines upward toward the center portion of the piston. Thus, the top face of the piston 101 has a pent-roof-like shape. A cavity 104 is formed in the intake-valve-side slant top face 102 such that the bottom surface of the cavity 104 is part of a virtual spherical surface centered at a point above the unillustrated intake valve. Accordingly, the cavity 104 of the piston 101 reverses the flow of air that enters the combustion chamber toward the top face of the piston 101 in order to cause the air to flow toward the lower surface of the cylinder head. Thus, generation of tumble flow (vertical swirl) is assisted. The fuel injected into the combustion chamber is guided to the cavity 104 and is then conveyed by means of the tumble flow from the periphery of the combustion chamber to the center portion of the combustion chamber.

In the piston 201 shown in FIG. 7B, on the side where the intake valve is disposed, an intake-valve-side slant top face 202 is formed, and on the side where the exhaust valve is disposed, an exhaust-valve-side slant top face 203 is formed. Thus, the top face of the piston 201 has a pent-roof-like shape. A cavity 204 is formed in the intake-valve-side slant top face 202. The cavity 204 is composed of a flow-entrance portion 205, a rising portion 206, and a connection portion 207. The flow of air that enters the combustion chamber toward the top face of the piston 201 is reversed in order to cause the air to flow toward the lower surface of the cylinder head. Thus, generation of tumble flow (vertical swirl) is assisted. The fuel injected into the combustion chamber is guided to the cavity 204 and is then conveyed by means of the tumble flow from the periphery of the combustion chamber to the center portion of the combustion chamber.

In the piston 301 shown in FIG. 7C, an intake-valve-side slant top face 302 and an exhaust-valve-side slant top face 203 are formed as in the piston 101 of FIG. 7A, so that the top face of the piston 301 has a pent-roof-like shape. A cavity 304 is formed in the intake-valve-side slant top face 302. The cavity 304 is defined by two virtual spherical surfaces 305 and 306 centered at positions above the intake valve and a connection surface 307 connecting the virtual spherical surfaces 305 and 306. Accordingly, the cavity 304 of the piston 301 reverses the flow of air that enters the combustion chamber toward the top face of the piston 301 in order to cause the air to flow toward the lower surface of the cylinder head. Thus, generation of tumble flow (vertical swirl) is assisted. The fuel injected into the combustion chamber is guided to the cavity 304 and is then conveyed by means of the tumble flow from the periphery of the combustion chamber to the center portion of the combustion chamber.

Further, U.S. Pat. No. 5,127,379 discloses the structure of a cylinder injection engine in which a spark plug is disposed at the center portion of the combustion chamber; an injection valve is disposed at the periphery of the combustion chamber; a depression is formed on the top face of the piston such that the depression extends from a point below the spark plug to a point below the injection valve; and a fuel guide groove narrower than the depression is formed on the inner wall surface of the depression at a location below the spark plug, such that the fuel guide groove extends from the side portion of the depression toward the spark plug.

In the cylinder injection engine described in the above-described Japanese Patent Application No. 7-233129, the cylinder diameter or the diameter of the piston varies depending on the displacement of the engine and the number of cylinders. If a piston having a certain diameter is designed to have the shape of the above-described piston 101, 201, or 301, the size of the cavity 104, 204, or 304 is increased or decreased in proportion to the diameter of the piston. However, when the size of the cavity 104, 204, or 304 is increased with the diameter of the piston, the curvature of the cavity 104, 204, or 304 decreases, and the volume of the cavity 104, 204, or 304 increases. As a result, the air-fuel mixture becomes leaner in the vicinity of the spark plug, with a fear that stratified combustion does not occur.

The cylinder injection engine disclosed in U.S. Pat. No. 5,127,379 is also configured in such a way that a vertical swirl flow is generated in the air that flows from the intake portion into the combustion chamber. The generation of the vertical swirl flow that starts in an intake stroke ends with the completion of the intake stroke, and in a subsequent compression stroke, the swirl flow is preserved by means of only inertia of the swirl flow. As described in this U.S. patent, since the fuel guide groove formed in the top face of this piston is narrower than the depression, an inflection point (corner portion) where the curvature changes drastically exists at the connection portion between the depression and the fuel guide groove as viewed from above. Therefore, the vertical swirl flow generated during the intake stroke causes a turbulence at the inflection point, so that the vertical swirl flow cannot be preserved up to the latter half of the compression stroke. Consequently, fuel cannot be guided by means of vertical swirl flow; the operation range in which reliable ignition and stable combustion are possible is limited; and a stratified combustion cannot be realized.

SUMMARY OF THE INVENTION

The present invention has been accomplished to solve the above-mentioned problems, and an object of the present invention is to provide a piston for a cylinder injection engine, which piston secures a precise flow of fuel within a combustion chamber to thereby improve combustion efficiency.

To achieve the above object, according to the present invention, there is a provided a piston for a cylinder injection engine which includes a combustion chamber defined by a lower surface of a cylinder head, a cylinder liner, and a top face of a piston; an injection valve disposed in the vicinity of an intake port of the engine and adapted to inject fuel into the combustion chamber; a spark plug disposed closer to the center portion of the combustion chamber than the injection valve; and a depression formed in the top face of the piston such that the depression faces the injection valve and the spark plug, wherein the depression is formed in such a way that a first curved surface located substantially below the spark plug and a second curved surface located substantially below the injection valve are composed of a said first different curvatures; the curvature of said first curved surface is set larger than that of said second curved surface; and said first curved surface and said second curved surface are smoothly connected via a connection portion.

Accordingly, fuel injected from the injection valve into the combustion chamber is caused by air from the intake port to reach the depression of the top face of the piston and is guided by the depression surface composed of a plurality of curved surfaces having different curvatures, so that the fuel flows to the spark plug in the form of swirl flow. Thus, reliable ignition and combustion can be realized. In addition, since the depression has an appropriate volume, a stratified combustion is established, resulting in an improved combustion efficiency. Further, the second curved surface having a smaller curvature secures a sufficiently large volume within the depression while the first curved surface having a larger curvature collects fuel mist effectively and causes the thus-collected fuel to flow to the spark plug. Thus, the stratified combustion is enabled.

Preferably, in the depression, a bottom of the first curved surface located substantially below the spark plug is located higher than a bottom of the second curved surface located substantially below the injection valve.

In this case, a sufficiently large volume is secured within the depression by means of the second curved surface and a sufficiently large distance is secured between the injection valve and this curved surface. Thus, fuel injected from the injection valve flows without adhering to the wall surface of the piston. Further, the distance between the spark plug and the curved surface of the depression is decreased by means of the first curved surface located higher than the second curved surface, fuel mist can be reliably caused to flow to the spark plug, enabling a stable combustion.

Preferably, the fuel injected from the injection valve impinges onto the depression of the piston at the second curved surface located substantially below the spark plug.

In this case, since flow of fuel mist toward the spark plug can be generated more reliably, the stability of combustion is improved.

Preferably, a cavity volume ratio expressed by the following equation is within a range of 0.3–0.7:

Cavity volume ratio=(Va+Vb)/(Va+Vb+Vc)

where Va is a volume of the depression; Vb is a volume of a space formed above the depression when the piston is in the top dead center position; and Vc is a volume of a space formed above the piston excluding the volume of the space formed above the depression when the piston is in the top dead center position.

In this case, since an appropriate depression volume is secured, the fuel consumption and output of the engine can be secured in a well-balanced manner.

Preferably, said depression is formed in such a way that of the depression located on the spark plug side with respect to the connection portion is smaller than a volume of the depression located on the injection valve side with respect to the connection portion.

In this case, fuel injected from the injection valve into the combustion chamber is guided by means of air from the intake port to flow from the injection-valve-side portion having a larger volume to the spark-plug-side portion having a smaller volume. Thus, the fuel flows to the spark plug effectively, so that reliable ignition and combustion can be realized.

Preferably, the depression is formed in such a way that the width of the depression in a direction perpendicular to a line connecting the spark plug and the injection valve increases from a position located substantially below the spark plug toward a position located substantially below the injection valve.

In this case, the fuel injected from the injection valve into the combustion chamber is guided by means of air from the intake port to flow toward the spark plug side where the depression has a. narrowed width. Thus, reliable ignition and combustion can be realized.

Preferably, a circumferential edge of the depression located on the spark plug side and a circumferential edge of the depression located on the injection valve side are smoothly connected.

In this case, fuel injected from the injection valve into the combustion chamber is caused, by means of air from the intake port, to flow from the injection valve side to the spark plug side along the smooth circumferential edge. Thus, reliable ignition and combustion can be realized.

DETAILED DESCRIPTION OF THE PREFERRED EMBODIMENTS

Embodiments of the present invention will now be described in detail with reference to the accompanying drawings which are given by way of illustration only, and they are not limitative of the present invention.

Figure 1A:
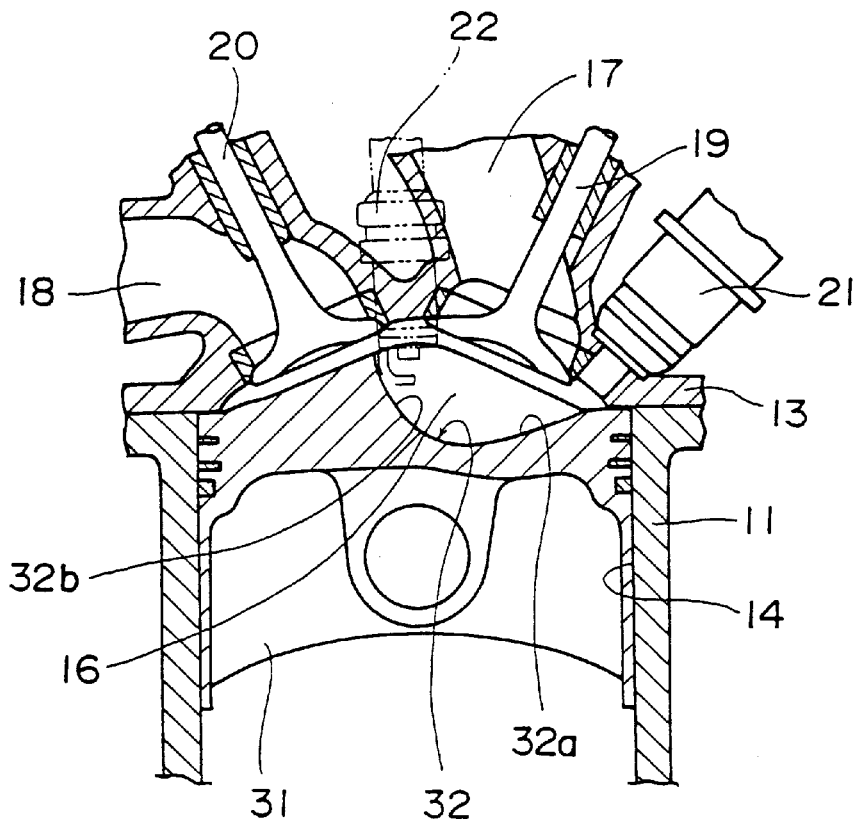
FIG. 1A is a schematic view of a combustion chamber and its vicinity, showing a piston for a cylinder injection engine according to a first embodiment of the present invention.
Figure 1B:
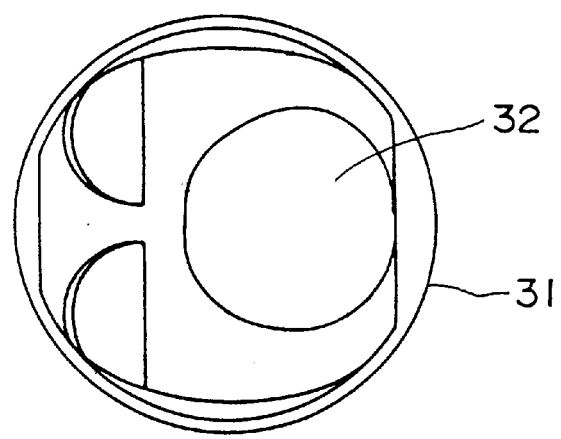
FIG. 1B is a top view of the piston shown in FIG. 1A.

FIG. 1A shows a schematic view of a combustion chamber and its vicinity, showing a piston for a cylinder injection engine according to a first embodiment of the present invention; FIG. 1B is a top view of the piston shown in FIG. 1A; and FIG. 2 shows a schematic view for describing the shape of a cavity in the piston according to the first embodiment.

As shown in FIG. 1A, in the cylinder injection engine according to the present embodiment, a cylinder head 13 is securely fixed onto a cylinder block 11. A piston 31 is placed in a cylinder 14 within the cylinder block 11 such that the piston 31 is movable in a vertical direction. The cylinder block 11, the cylinder head 13, and the piston 31 define a combustion chamber 16, to which an intake port 17 and an exhaust port 18 are connected. The intake port 17 is opened and closed by an intake valve 19, while the exhaust port 18 is opened and closed by an exhaust valve 20. Also, a fuel injection valve 21 for injecting fuel into the combustion chamber 16 is attached to the cylinder head 13 in the vicinity of the intake port 17. Further, a spark plug 22 for igniting fuel mist injected from the fuel injection valve 21 into the combustion chamber 16 is attached to the cylinder head 13 at the center of the top portion of the combustion chamber 16.

In the cylinder injection engine having the above-described structure, the piston 31 according to the present embodiment has a cavity 32 that is formed in the tope face of the piston 31 and serves as a depression. In the cavity 32, a curved surface that connects a curved surface of the cavity 32 located substantially below the spark plug 22 and a curved surface of the cavity 32 located substantially below the injection valve 21 is composed of a plurality of curved surfaces having different curvatures to minimize the length thereof.

Figure 2:
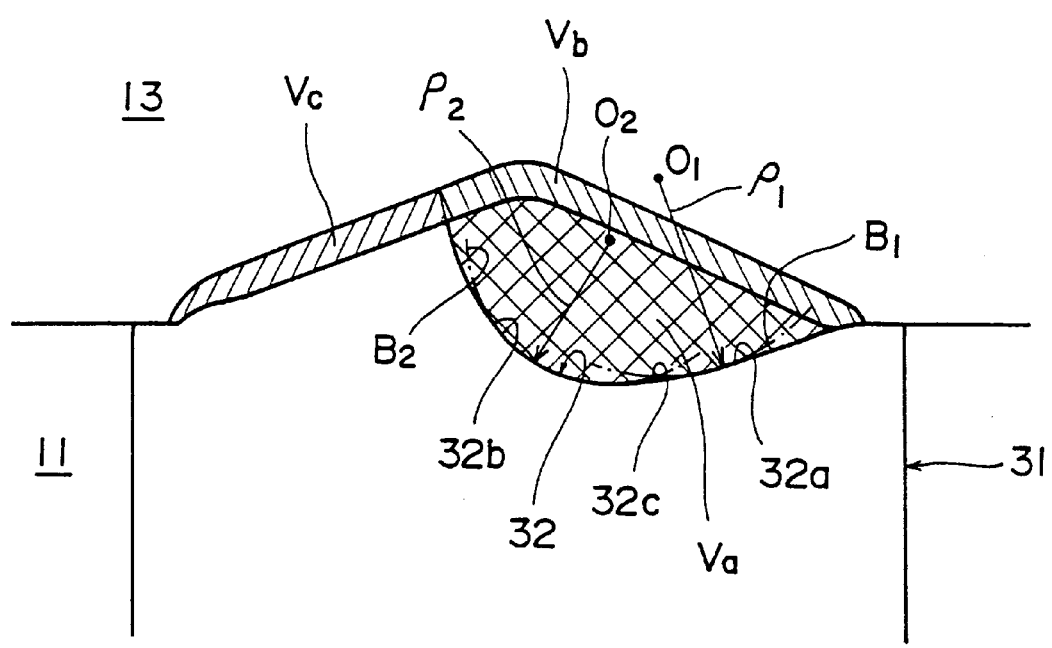
FIG. 2 is a schematic view for describing the shape of a cavity in the piston according to the first embodiment.

That is, as shown in FIGS. 1A, 1B, and 2, in the cavity 32 of the piston 31, a curved surface 32a located substantially below the fuel injection valve 21 is a spherical surface $B_1$ centered at a point $O_1$ and having a radius of curvature $\rho_1$. Also, a curved surface 32b located substantially below the spark plug 22 is a spherical surface $B_2$ centered at a point $O_2$ and having a radius of curvature $\rho_2$. The curved surfaces 32a and 32b are connected smoothly by means of a connection curved surface 32c such that the distance between the curved surfaces 32a and 32b is minimized. The radius of curvature $\rho_1$ of the curved surface 32a and the radius of curvature $\rho_2$ of the curved surface 32b satisfy a relationship $\rho_1 > \rho_2$; i.e., the curvature $\kappa_1$ of the curved surface 32a and the curvature $\kappa_2$ of the curved surface 32b satisfy a relationship $\kappa_1 < \kappa_2$. Further, the cavity 32 formed by the continuous curved surface 32a, 32b, and 32c slightly expands laterally (in the vertical direction in FIG. 1B) as viewed from above the cavity 32.

The volume of the cavity 32 greatly affects the performance of the engine. For example, when the ratio of the volume of the cavity 32 to the overall volume of the combustion chamber 16 is excessively large, the surface area increases, resulting in an increased heat loss, although the increase is advantageous for stratified combustion. By contrast, when the ratio of the volume of the cavity 32 to the overall volume of the combustion chamber 16 is excessively small, generation of a tumble flow (swirl flow) cannot be assisted sufficiently, making establishment of the stratified combustion impossible, although the output power increases. To overcome these drawbacks, in the cylinder injection engine of the present embodiment, the volume of the cavity 32 is set in order to generate a tumble flow (swirl flow) to thereby enable stratified combustion, while securing sufficient output power.

That is, as shown in. FIG. 2, when the volume of the cavity 32 is represented by Va, the volume of a space formed above the cavity 32 when the piston 31 is in the top dead center position is represented by Vb, and the volume of a space formed above the piston 31 excluding the space formed above the cavity 32 when the piston 31 is in the top dead center position is represented by Vc, the volume ratio of the cavity 32 is expressed by the following equation:

Cavity volume ratio=(Va+Vb)/(Va+Vb+Vc).

An optimal value for the cavity volume ratio is approximately 0.5. However, the cavity volume ratio may be set in the range of 0.3–0.7. When the cavity volume ratio is set to fall in this range, reduction of the energy consumption and securing of the output power are realized in a well-balanced manner. In the present embodiment, since the top face of the piston has a pent-roof-like shape, the space surrounded by the piston 31 and the cylinder head 13 at the top dead center position can be decreased, so that the volume ratio of the cavity 32 to the overall volume of the combustion chamber 16 can be increased. Accordingly, the output power can be increased through an increase in the compression ratio of the engine.

As described above, in the present embodiment, the cavity volume ratio is set in accordance with the above-described equation; the curved surface 32a located below the fuel injection valve 21 and the curved surface 32b located below the spark plug 22 are connected smoothly by means of the connection curved surface 32c; and the curvature $\kappa_1$ of the curved surface 32a and the curvature $\kappa_2$ of the curved surface 32b are set to satisfy the relationship $\kappa_1<\kappa_2$. Therefore, air flowing into the combustion chamber 16 from the intake port 17 is assisted by the cavity 32 to generate a tumble flow (vertical swirl flow). That is, the air flowing into the combustion chamber 16 moves downward toward the top face of the piston 31 along the cylinder liner adjacent the intake port 17, and is guided by means of the curved surface 32a of the cavity 32 to the center portion of the combustion chamber 16. Further, the flow of the air is reversed by means of the curved surface 32b in order to cause the air to flow toward the lower surface of the cylinder head 13. When the engine is operated in a low/intermediate load range, fuel is injected from the fuel injection valve 21 into the combustion chamber 16 during a middle period or a final period of the compression stroke, and the fuel impinges the surface of the cavity 32 and flows toward the spark plug 22 along the curved surfaces 32a and 32b of the cavity 32 and is guided toward the spark plug 22 by means of a tumble flow.

That is, the curved surface 32a, having a smaller curvature and provided on the side where the fuel injection valve 21 is positioned, secures a sufficient cavity volume and effectively guides the fuel mist injected from the fuel injection valve 21, while the curved surface 32b, having a larger curvature and provided on the side where the spark plug 22 is positioned, effectively collects the fuel mist and reliably causes the fuel mist to flow toward the spark plug 22. Accordingly, reliable ignition and combustion can be realized within the combustion chamber 16, and the stratified combustion is enabled through provision of a proper cavity volume, so that the combustion efficiency can be improved.

Figure 3A:
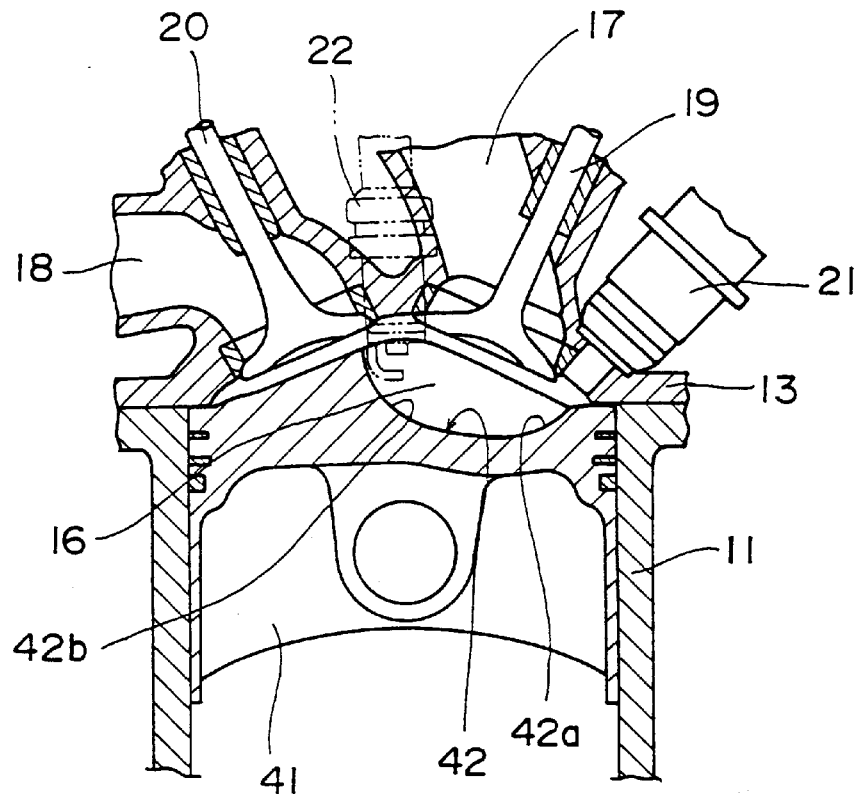
FIG. 3A is a schematic view of a combustion chamber and its vicinity, showing a piston for a cylinder injection engine according to a second embodiment of the present invention.
Figure 3B:
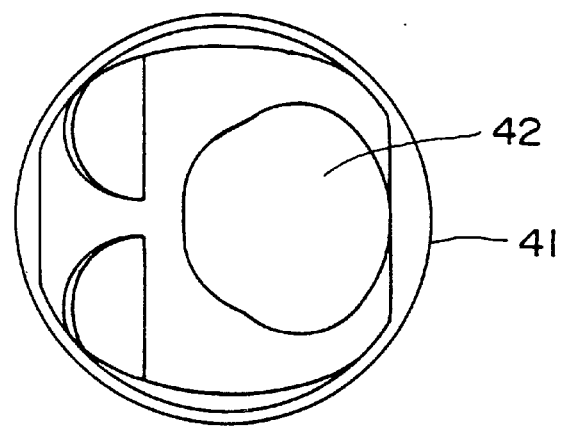
FIG. 3B is a top view of the piston shown in FIG. 3A.
Figure 4:
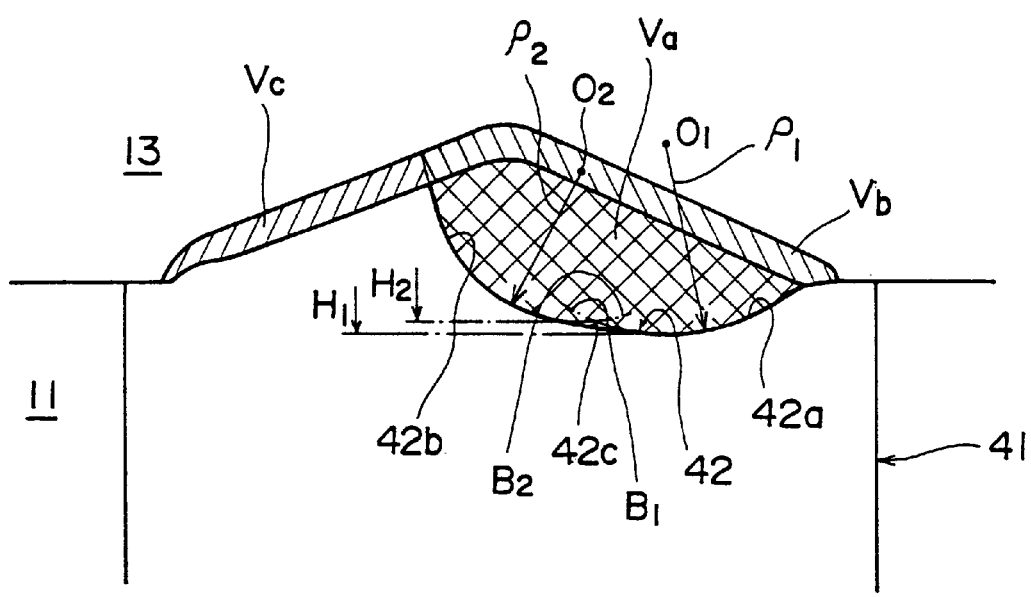
FIG. 4 is a schematic view for describing the shape of a cavity in the piston according to the second embodiment.
Figure 5A:
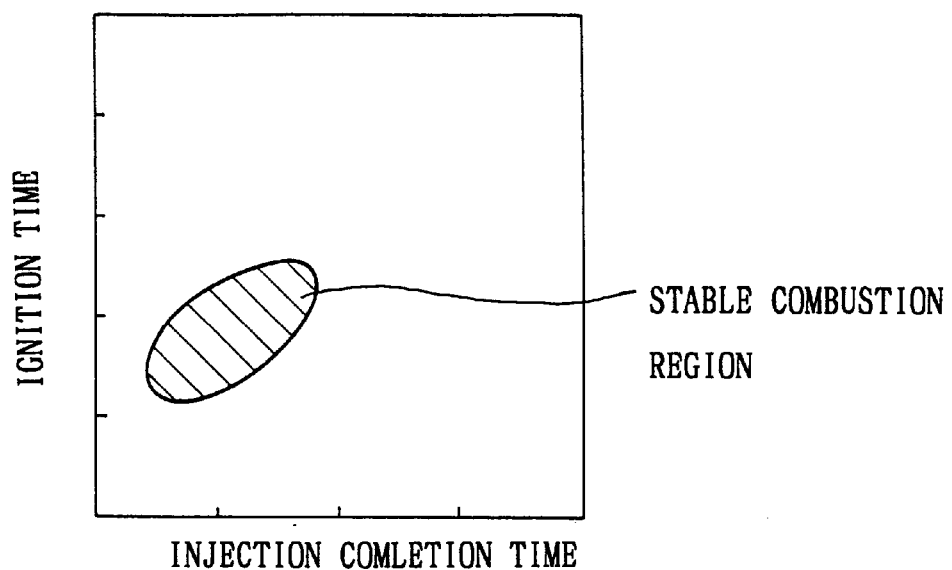
FIGS. 5A and 5B are graphs showing stable combustion regions during idling operation.
Figure 5B:
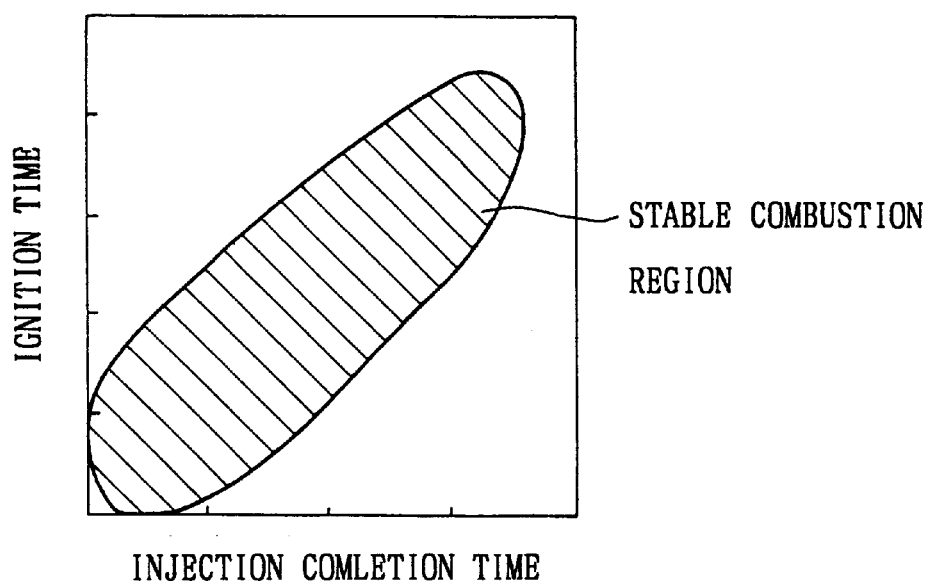
Figure 6:
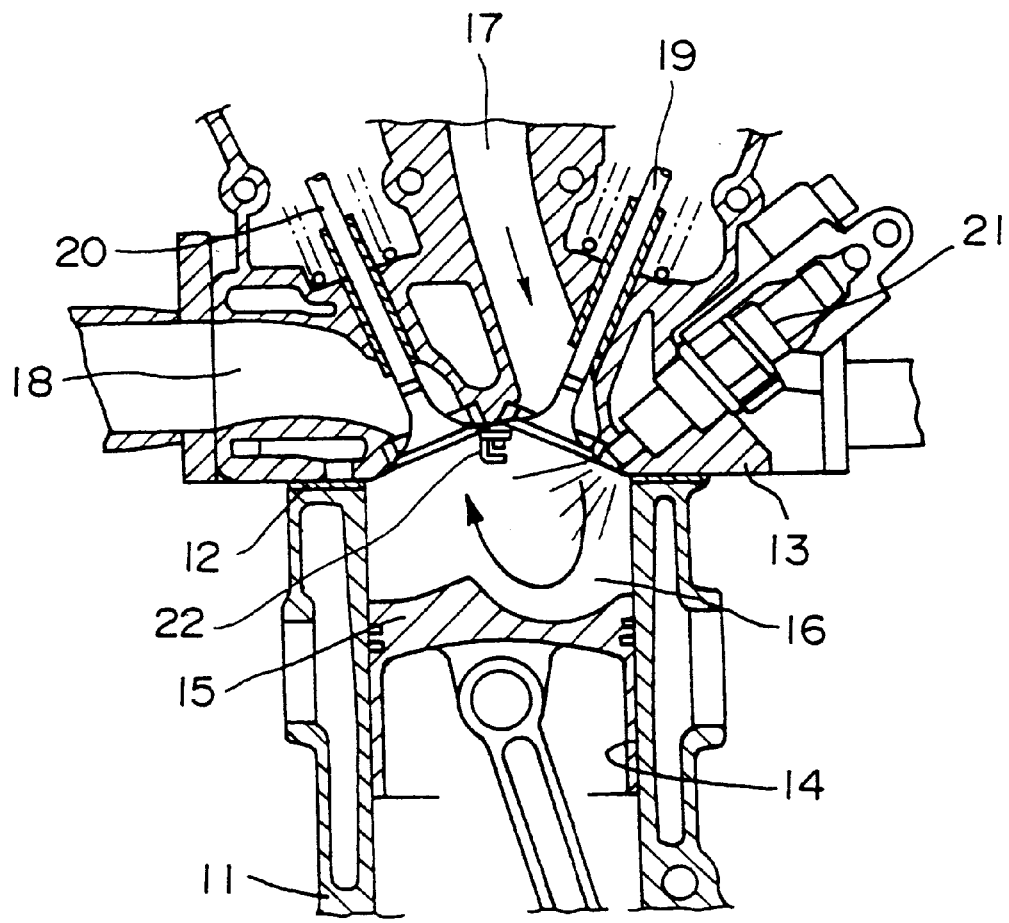
FIG. 6 shows a cross section of a combustion chamber and its vicinity within a typical cylinder injection engine.
Figure 7C:
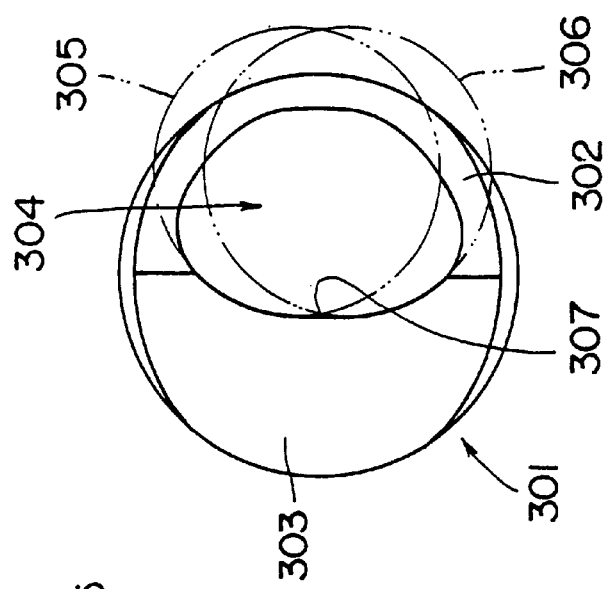
FIGS. 7A–7C are schematic views of conventional pistons each having a cavity.
Figure 7B:
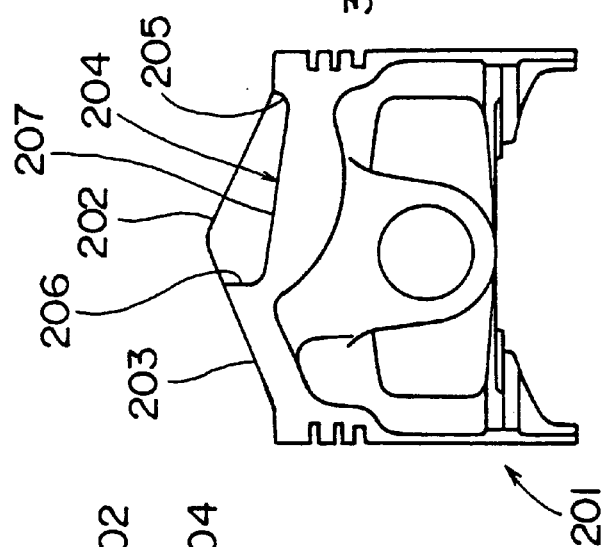
Figure 7A:
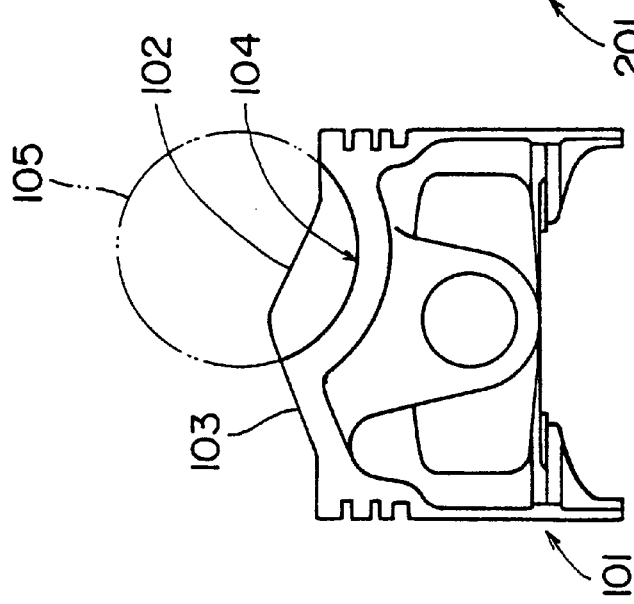

FIG. 3A shows a schematic view of a combustion chamber and its vicinity, representing a piston for a cylinder injection engine according to a second embodiment of the present invention; FIG. 3B is a top view of the piston shown in FIG. 3A; FIG. 4 shows a schematic view for describing the shape of a cavity in the piston according to the second embodiment; and FIGS. 5A and 5B are graphs showing stable combustion regions during idling operation. Elements having the same functions as those described in the first embodiment are denoted by the same symbols, and descriptions thereof will be omitted.

As shown in FIGS. 3A and 3B, in a piston 41 for a cylinder injection engine according to the present embodiment, a cavity 42 serving as a depression is formed in the tope face of the piston 41. In the cavity 42, as shown in FIG. 4, a curved surface 42a located substantially below the fuel injection valve 21 is a spherical surface $B_1$ centered at a point $O_1$ and having a radius of curvature $\rho_1$. Also, a curved surface 42b located substantially below the spark plug 22 is a spherical surface $B_2$ centered at a point $O_2$ and having a radius of curvature $\rho_2$. The curved surfaces 42a and 42b are connected smoothly by means of a connection curved surface 42c such that the distance between the curved surfaces 42a and 42b is minimized. The radius of curvature $\rho_1$ of the curved surface 42a and the radius of curvature $\rho_2$ of the curved surface 42b satisfy a relationship $\rho_1>\rho_2$; i.e., the curvature $\kappa_1$ of the curved surface 42a and the curvature $\kappa_2$ of the curved surface 42b satisfy a relationship $\kappa_1<\kappa_2$.

Moreover, in the present embodiment, the cavity 42 is designed in such a manner that the height $H_1$ of the lowest portion of the curved surface 42a, located substantially below the fuel injection valve 21, is less than the height $H_2$ of the lowest portion of the curved surface 42b located substantially below the spark plug 22. That is, the bottom of the curved surface 42b is located higher than is the bottom of the curved surface 42a, and the connection curved surface 42c inclines upward toward the center of the piston 41. Further, the cavity 42 formed by the continuous curved surface 42a, 42b, and 42c slightly expands laterally (in the vertical direction in FIG. 3B) as viewed from above the cavity 42.

As described above, in the present embodiment, the cavity volume ratio is set in accordance with the above-described equation as in the first embodiment; the curved surface 42a located below the fuel injection valve 21 and the curved surface 42b located below the spark plug 22 are connected smoothly by means of the connection curved surface 42c; the curvature $\kappa_1$ of the curved surface 42a and the curvature $\kappa_2$ of the curved surface 42b are set to satisfy the relationship $\kappa_1<\kappa_2$; and the height $H_1$ of the curved surface 42a is made less than the height $H_2$ of the curved surface 42b. Therefore, air flowing into the combustion chamber 16 from the intake part 17 is assisted by the cavity 42 to generate a tumble flow (vertical swirl flow). That is, the air flowing into the combustion chamber 16 moves downward toward the top face of the piston 41 along the cylinder liner adjacent the intake port 17, and is guided by means of the curved surface 42a of the cavity 42 to the center portion of the combustion chamber 16. Further, the flow of the air is reversed by means of the curved surface 42b of the cavity 42 in order to cause the air to flow toward the lower surface of the cylinder head 13. When the engine is operated in a low/intermediate load range, fuel is injected from the fuel injection valve 21 into the combustion chamber 16 during a middle period or a final period of the compression stroke, and the fuel impinges the surface of the cavity 42 and flows toward the spark plug 22 along the curved surfaces 42a and 42b of the cavity 42 and is guided toward the spark plug 22 by means of a tumble flow.

That is, the curved surface 42a having a smaller curvature and provided on the side where the fuel injection valve 21 is positioned secures a sufficient cavity volume and effectively guides fuel mist injected from the fuel injection valve 21 without causing adhesion of the fuel to the top surface (curved surface 42a) of the piston. Meanwhile, the curved surface 42b having a larger curvature and positioned closer to the spark plug 22 makes the distance between the spark plug 22 and the wall surface of the cavity 42 a desired value, so that the fuel mist can be effectively collected and caused to reliably flow toward the spark plug 22. Accordingly, reliable ignition and combustion can be realized within the combustion chamber 16, and the stratified combustion is enabled through provision of a proper cavity volume, so that combustion efficiency can be improved.

The piston 41 having the above-described cavity 42 is effective during idling operation of the cylinder injection engine. That is, as described above, the fuel mist injected from the fuel injection valve 21 into the combustion chamber 16 is led to the cavity 42 of the piston 41. At this time, if the distance between the fuel injection valve 21 and the curved surface 42a at the side of the fuel injection valve 21 is excessively small, the fuel mist impinges the curved surface 42a and adheres to the curved surface 42a after liquefaction. In addition, since the engine is in a low rotational speed region during the idling operation, the moving velocity of the piston is also low, so that the flow of the tumble flow generated within the cylinder is low. However, in the piston 41 according to the present embodiment, the curved surface 42a of the cavity 42 located at the side of the fuel injection valve 21 is a predetermined distance away from the fuel injection valve 21, and has a small curvature. Therefore, even when a sufficiently strong tumble flow is not generated, the fuel mist from the fuel injection valve 21 is guided by the curved surface 42a to the center of the piston 41 and is then caused by the curved surface 42b to flow toward the spark plug 22. Therefore, reliable ignition and combustion are realized within the combustion chamber 16.

This is also apparent from the graphs shown in FIGS. 5A and 5B. The graphs of FIGS. 5A and 5B show stable combustion regions during idling operation. The graph of FIG. 5A is for the cylinder injection engine employing the piston 31 according to the first embodiment, while the graph of FIG. 5B is for the cylinder injection engine employing the piston 41 according to the second embodiment. As shown in these graphs, the piston 41 realizes a wider stable combustion region during idling operation compared with the piston 31. By virtue of the above-described structure in which the bottom of the curved surface 42a at the side of the fuel injection valve 21 is set to be lower than the bottom of the curved surface 42b at the side of the spark plug 22, the fuel mist from the fuel injection valve 21 can be led to the center of the piston 41 without causing adhesion to the curved surface 42a, so that reliable ignition and combustion are realized within the combustion chamber 16, and combustion stability is improved.

In the above-described embodiments, the cavity 32 is formed by the two curved surface 32a and 32b and the connection curved surface 32c connecting them, while the cavity 42 is formed by the two curved surface 42a and 42b and the connection curved surface 42c connecting them. However, in the present invention, the number of the curved surfaces are not limited to that of the respective embodiments. Further, in the present invention, the type of the cylinder injection engine is not limited to the above-described type. Even when the present invention is applied to an engine in which the intake port and the exhaust port are provided symmetrically in the cylinder head in order to generate swirls within the combustion chamber, action and effects equivalent to those of the above-described embodiments can be attained.

As specifically described in the embodiments, in the piston for a cylinder injection engine according to the present invention, the spark plug is disposed closer to the center portion of the combustion chamber than the injection valve; a depression is formed in the top face of the piston such that the depression faces the injection valve and the spark plug; a curved surface of the depression that connects a curved surface located substantially below the spark plug and a curved surface located substantially below the injection valve is composed of a curved surface having a plurality of curvatures to minimize the length thereof. Accordingly, fuel injected from the injection valve into the combustion chamber is caused, by air flowing into the combustion chamber from the intake port, to reach the depression of the top face of the piston and is guided by the depression surface composed of the curved surface having a plurality of curvatures, so that the fuel flows to the spark plug in the form of swirl flow. Thus, reliable ignition and combustion can be realized within the combustion chamber. In addition, since the depression has a proper volume, the stratified combustion is effected, resulting in an improved combustion efficiency.

Also, in the present invention, among the plurality of curvatures, the curvature on the spark plug side is set larger than that on the injection valve side. Therefore, the injection-valve-side curved surface having a smaller curvature secures a sufficiently large volume within the depression, while the spark-plug-side curved surface having a larger curvature effectively collects fuel mist and causes the thus-collected fuel to reliably flow to the spark plug. Thus, the stratified combustion is enabled.

Further, in the present invention, the bottom of the curved surface located substantially below the spark plug is located higher than the bottom of the curved surface located substantially below the injection valve. Therefore, a sufficiently large distance is secured between the injection valve and the curved surface located below the injection valve, so that a sufficient large volume can be secured within the depression, and thus the fuel injected from the injection valve can be caused to flow without adhesion to the curved surface of the depression. Further, since the distance between the spark plug and the curved surface of the depression is decreased by means of the spark-plug-side curved surface being located higher than the injection-valve-side curved surface, fuel mist can be reliably caused to flow to the spark plug, so that combustion stability within the combustion chamber can be improved.

Moreover, in the present invention, fuel injected from the injection valve impinges onto the depression of the piston at a position located substantially below the spark plug. Therefore, the fuel mist flow toward the spark plug more reliably, so that the stability of combustion is improved. Accordingly, an advantageous effect can be obtained especially in a low engine speed region such as an idling operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A piston for a cylinder injection engine comprising:
    a combustion chamber defined by a lower surface of a cylinder head, a cylinder liner, and a top face of a piston;
    an injection valve disposed in the vicinity of an intake port of said engine and adapted to inject fuel into said combustion chamber;
    a spark plug disposed closer to the center portion of said combustion chamber than said injection valve; and
    a depression formed in the top face of said piston such that said depression substantially faces said injection valve and said spark plug, wherein
        said depression is formed such that a first curved surface located substantially below said spark plug and a second curved surface located substantially below said injection valve are composed of different curvatures;
        the curvature of said first curved surface is set larger than that of said second curved surface;

a connection portion defining a shortest portion of said depression connecting said first curved surface and said second curved surface; and a volume of said depression being set to enable stratified combustion, while securing sufficient power.

2. A piston for a cylinder injection engine according to claim 1, wherein said depression is formed in such a way that a volume of said depression located on the spark plug side with respect to said connection portion is smaller than a volume of said depression located on the injection valve side with respect to said connection portion.

3. A piston for a cylinder injection engine according to claim 1, wherein said depression is formed in such a way that the width of said depression in a direction perpendicular to a line connecting said spark plug and said injection valve increases from a position located substantially below said spark plug toward a position located substantially below said injection valve.

4. A piston for a cylinder injection engine according to claim 1, wherein a circumferential edge of said depression located on the side corresponding to said spark plug and a circumferential edge of said depression located on the side corresponding to said injection valve are smoothly connected.

5. A piston for a cylinder injection engine comprising:

a combustion chamber defined by a lower surface of a cylinder head, a cylinder liner, and a top face of a piston;

an injection valve disposed in the vicinity of an intake port of said engine and adapted to inject fuel into said combustion chamber;

a spark plug disposed closer to the center portion of said combustion chamber than said injection valve; and a depression formed in the top face of said piston such that said depression substantially faces said injection valve and said spark plug, wherein said depression is formed such that a first curved surface located substantially below said spark plug and a second curved surface located substantially below said injection valve are composed of different curvatures;

the curvature of said first curved surface is set larger than that of said second curved surface; and said first curved surface and said second curved surface are smoothly connected via a connection portion, wherein said depression is formed in such a manner that a bottom of said first curved surface located substantially below said spark plug is located higher than a bottom of said second curved surface located substantially below said injection valve.

6. A piston for a cylinder injection engine according to claim 5, wherein the fuel injected from said injection valve impinges onto said depression of said piston at said second curved surface located substantially below said injection valve.

7. A piston for a cylinder injection engine comprising:

a combustion chamber defined by a lower surface of a cylinder head, a cylinder liner, and a top face of a piston;

an injection valve disposed in the vicinity of an intake port of said engine and adapted to inject fuel into said combustion chamber;

a spark plug disposed closer to the center portion of said combustion chamber than said injection valve; and a depression formed in the top face of said piston such that said depression substantially faces said injection valve and said sMark plug, wherein said depression is formed such that a first curved surface located substantially below said spark plug and a second curved surface located substantially below said injection valve are composed of different curvatures;

the curvature of said first curved surface is set larger than that of said second curved surface; and said first curved surface and said second curved surface are smoothly connected via a connection portion, wherein a cavity volume ratio expressed by the following equation is within a range of 0.3–0.7:

Cavity volume ratio $(Va+Vb)/(Va+Vb+Vc)$ where Va is a volume of said depression; Vb is a volume of a space formed above said depression when said piston is in a top dead center position; and Vc is a volume of a space formed above said piston excluding said volume of the space formed above said depression when said piston is in the top dead center position.

* * * * *